United States Patent [19]

Wasservogel

[11] 4,348,035
[45] Sep. 7, 1982

[54] TOWING ATTACHMENTS FOR ATTACHING TRAILERS TO VEHICLES

[76] Inventor: François Wasservogel, Treffort - 01370 Saint Etienne du Bois, France

[21] Appl. No.: 243,967

[22] Filed: Feb. 22, 1980

[51] Int. Cl.³ .................. B60D 7/00; B60D 1/08
[52] U.S. Cl. ...................... 280/478 R; 280/422; 280/495; 280/504; 280/508; 280/510
[58] Field of Search ............ 280/495, 504, 507, 508, 280/509, 510, 514, 515, 477, 478 R, 420, 422, 491 E; 403/329, 330, 321, 325; 285/317

[56] References Cited

U.S. PATENT DOCUMENTS

| 1,276,548 | 8/1918 | Litten | 280/504 |
| 2,062,788 | 12/1936 | Jacob | 280/477 |
| 2,417,646 | 3/1947 | Hallner | 280/478 R |
| 3,368,182 | 2/1968 | Culver | 403/329 |
| 3,544,951 | 12/1970 | Roberts | 403/329 X |
| 3,891,237 | 6/1975 | Allen | 280/477 |

Primary Examiner—Joseph F. Peters, Jr.
Assistant Examiner—Donn McGiehan
Attorney, Agent, or Firm—Lerner, David, Littenberg & Samuel

[57] ABSTRACT

Towing attachments for attaching trailers to the end of various vehicles are disclosed, including a tubular sleeve attached to the vehicle, an extension bar having one end rotatably attached to the tow bar of the trailer while the other end is adapted to be releasably attached to the tubular sleeve and having a cross-sectional shape which is complementary to that of the tubular sleeve so that it may slide smoothly into same for attachment thereto, and a clamp for releasably clamping the end of the extension bar to the tubular sleeve, the clamp including a fixed trunnion extending from the tubular sleeve and a resilient clamp affixed to the extension bar so that the resilient clamp can be releasably clamped to the fixed trunnion when the extension bar slides into the tubular sleeve, the resilient clamp being pivotable between a first position in which it does not interfere with the sliding of the extension bar into the tubular sleeve and a second position in which it prevents the extension bar from being slidably released from the tubular sleeve, and furthermore so that the tubular sleeve can be located inwardly with respect to the end of the vehicle to which the trailer is to be attached.

11 Claims, 4 Drawing Figures

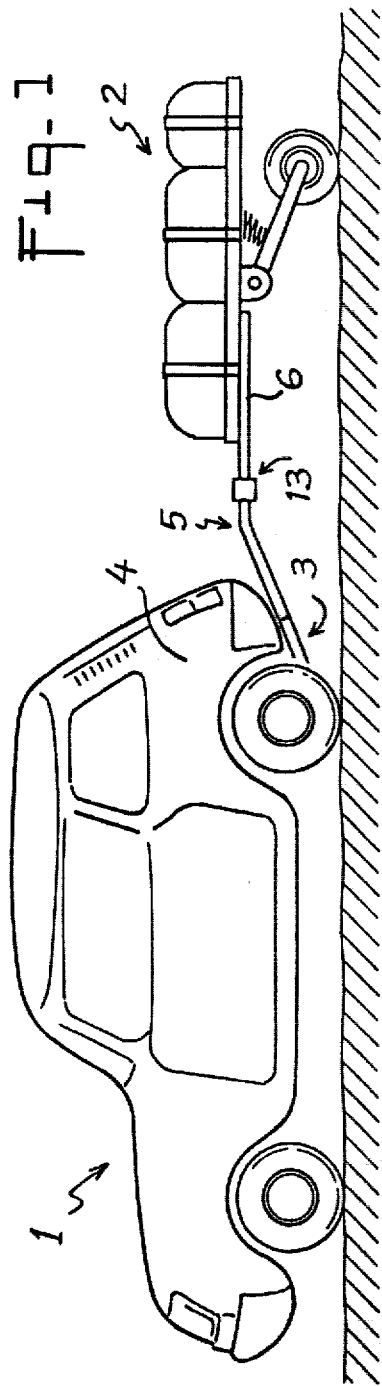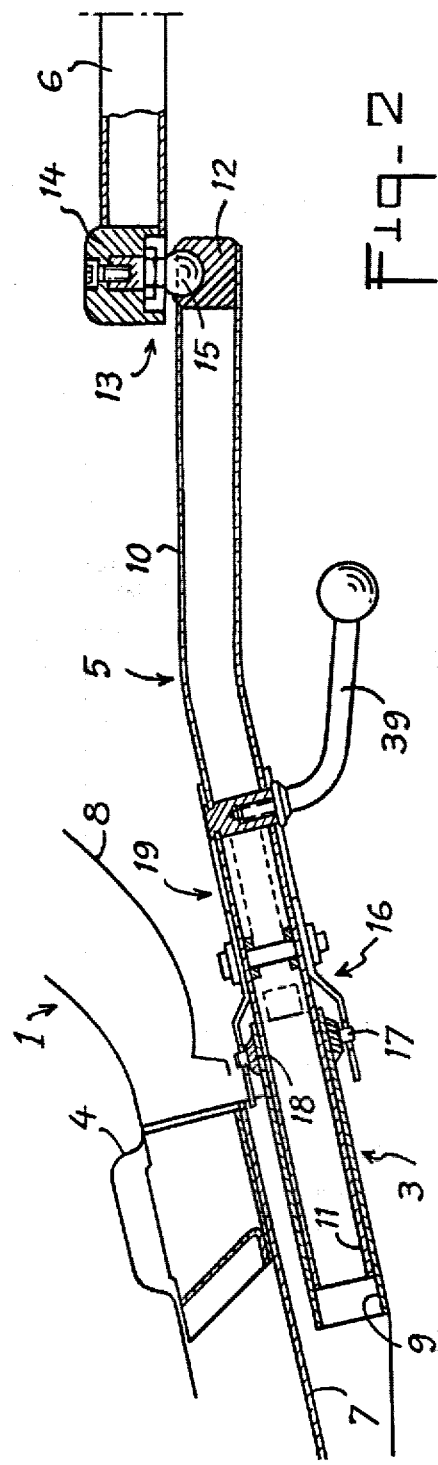

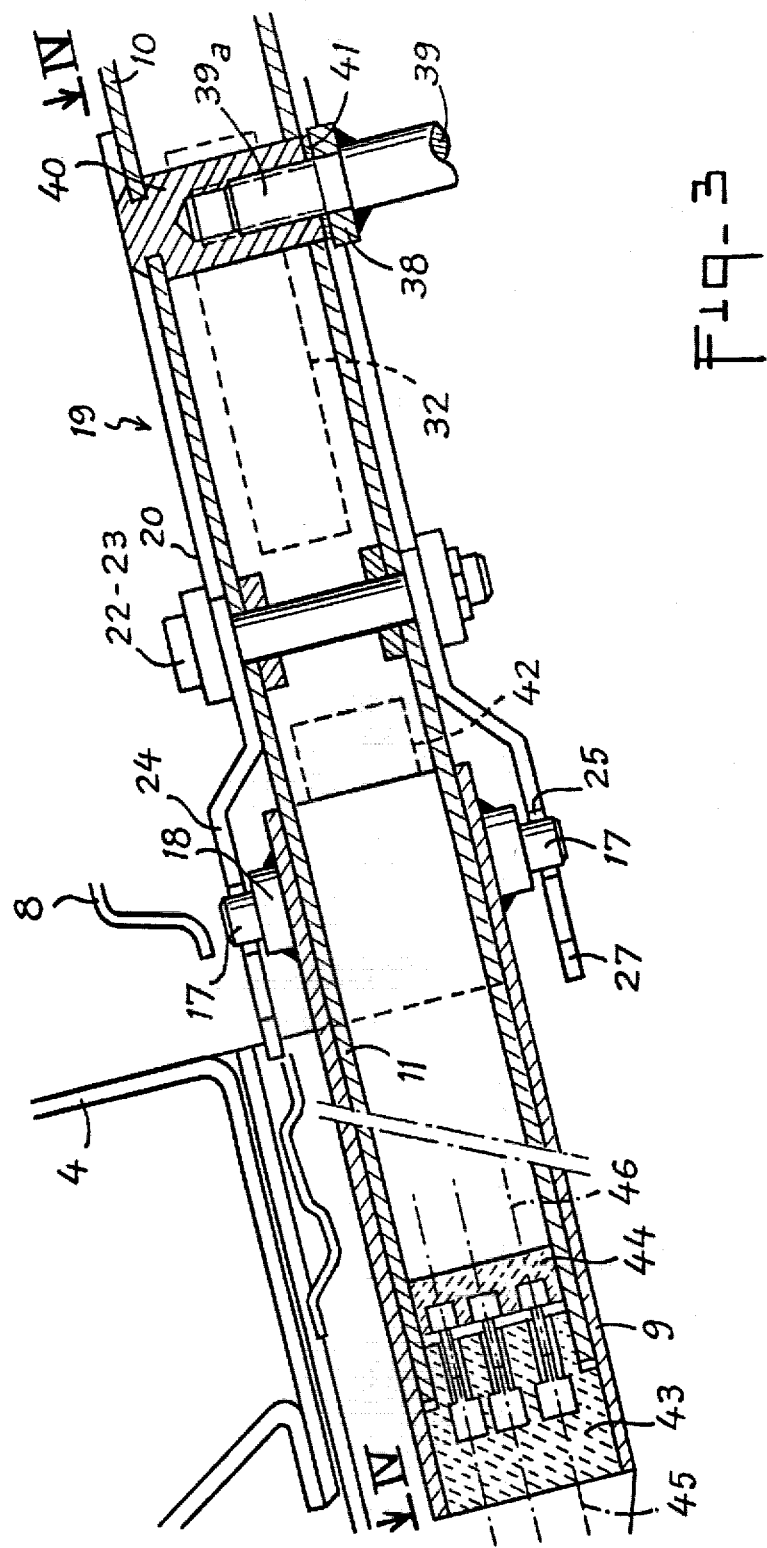

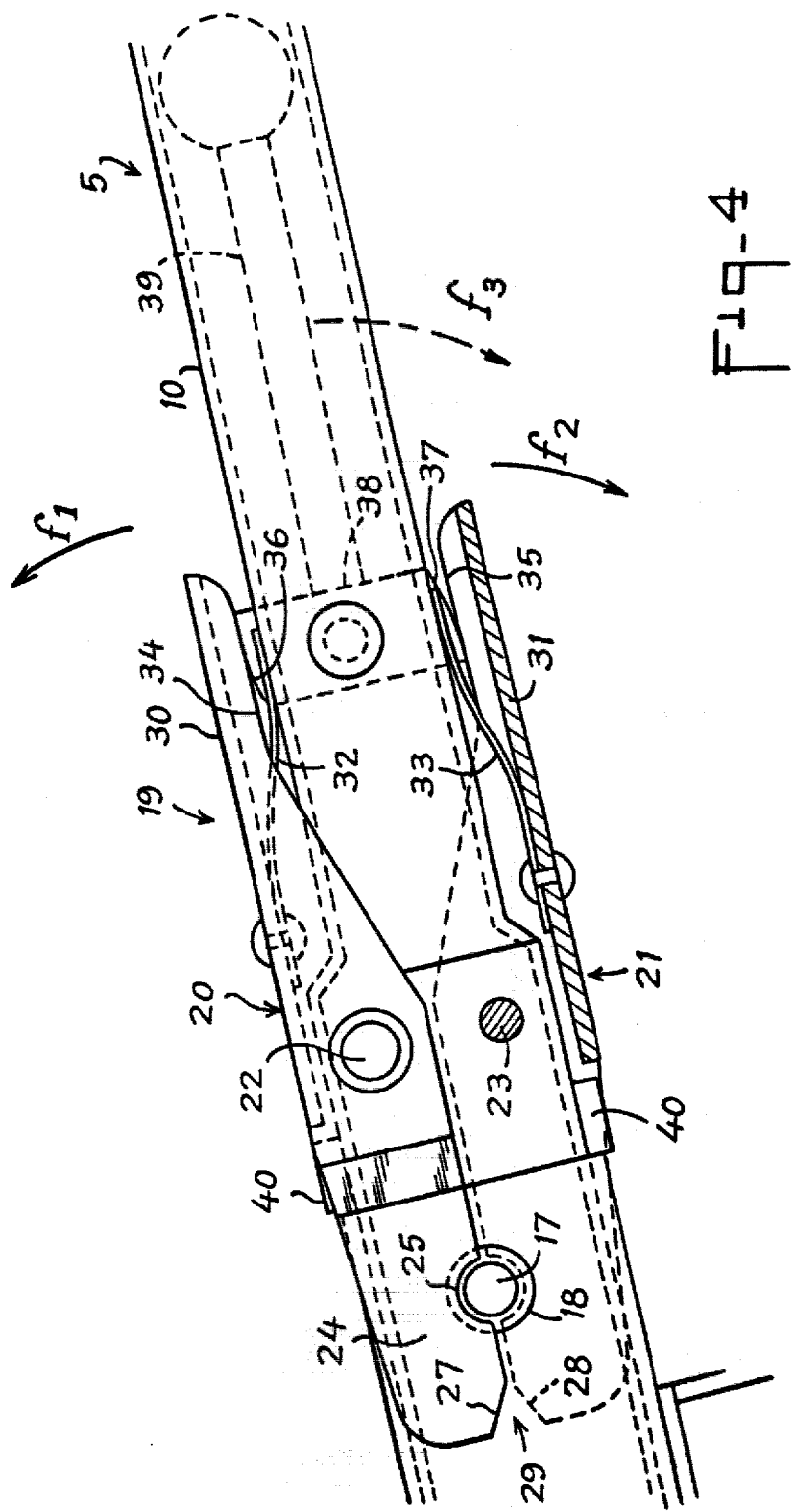

TOWING ATTACHMENTS FOR ATTACHING TRAILERS TO VEHICLES

FIELD OF THE INVENTION

The present invention relates to towing attachments used to connect a trailer to a vehicle. More particularly, the present invention relates to towing attachments used to connect a trailer to a motorized vehicle.

BACKGROUND OF THE INVENTION

Towing attachments are already known for connecting trailers to vehicles. Generally, these known towing attachments include a joining device carried by a fastening structure permitting their fitting onto the chassis, frame or any other rear part of the towing vehicle. Such joining devices generally comprise a universal type of joint, such as a swivel joint, which permanently projects from the outermost rear end of the vehicle so as to allow for the connection and disconnection of the complementary member carried by the tow bar to ensure a safe connection, which must particularly resist any pulling forces exerted thereon when the vehicle is moving.

Towing attachments of the aforesaid type are not entirely satisfactory for at least two reasons.

The first such reason is that the joining device, such as the swivel joint, must always protrude from the outermost rear end of the vehicle, and it therefore represents a dangerous projection not only for other vehicles in general, especially during parking, but also for pedestrians who may be required to walk around such a vehicle.

The second such reason is that the joining device is, for these same reasons, completely exposed to knocks, and it thus becomes necessary to constantly protect the swivel in order to prevent any damage thereto, which would then interfere with its cooperation with the complementary member of the tow bar.

In addition to the aforesaid disadvantages, it should be indicated that such towing attachments are also rather unsightly, particularly when fitted on a motorcar.

It has also been proposed to place a hollow part on the towing vehicle for receiving an extension from a swivel joint carried by the tow bar of the trailer. Such devices also make use of an automatic bolt associated with the hollow part and adapted to immobilize the extension.

All of these devices, however, do not solve the problem of eliminating any towing attachment parts which would protrude from the towing vehicle. Indeed, considering that the bolt needs to be manually operated in order to detach the trailer from the towing vehicle, the hollow part must remain accessible, and to this end, at least part of it must necessarily be situated on the outside of the towing vehicle.

Moreover, these aforesaid known devices can only assume the functions of joining and towing, and it is therefore necessary to fit an electric coupling connector on the rear of the towing vehicle for feeding power to the servitudes of the trailer. These connectors should also be accessible, and have always been found to be, if not actually protruding, at least apparent, and are therefore exposed to considerable risks of damages through knocks or shocks.

It is therefore an object of the present invention to overcome these disadvantages, and to propose a new towing attachment means having the advantage, when the vehicle is not towing a trailer, of being totally concealed, and of comprising no parts whatsoever projecting outwardly from the outermost rear parts of the towing vehicle.

Another object of the present invention is to simultaneously assume the additional function of automatic connection of any electrical circuits that may be provided on the towed trailer so as to ensure the simultaneous power supply of the elements, apparatus, or electrical members, required, for example, to work simultaneously to homologous members carried by the towing vehicle.

SUMMARY OF THE INVENTION

In accordance with the present invention, it has now been discovered that these and other objects can be accomplished by means of a towing attachment for attaching a trailer including a tow bar to the end of a vehicle comprising a tubular member attached to the vehicle, extension means including a first end and a second end, the first end being rotatably attached to the tow bar of the trailer and the second end being adapted for releasable attachment to the tubular member, the second end of the extension means having a cross-sectional shape which is complementary to the cross-sectional shape of the tubular member, whereby it may slide smoothly into the tubular member for attachment thereto, and clamping means for releasably clamping the second end of the extension means to the tubular member, the clamping means including fixed trunnion means extending from the tubular member and resilient clamping means affixed to the extension means, whereby the resilient clamping means may be releasably clamped to the trunnion means when the extension means slides into the tubular member, the resilient clamping means being pivotable between first and second positions so that when it is in its first position, it does not interfere with the sliding of the extension means into or out of the tubular member, and when the clamping means is in its second position, it prevents the extension means from being slidably released from the tubular member, and whereby the tubular member may be located inwardly with respect to the end of the towing vehicle.

Therefore, in accordance with this invention, the towing attachment, which is particularly intended for use with motorized vehicles of various types, is characterized by three specific elements, namely, the tubular member, the extension means, and the clamping means thereof. The tubular member generally comprises hollow part having a sleeve-shaped tubular segment of polygonal cross-section which can be fitted to the towing vehicle so that it is situated, even at its outer most end, at most in line with the corresponding external portion of the vehicle itself. Secondly, the extension portion means generally comprises short tow bar carried by the towed vehicle or trailer and forming a tubular drive-in segment having a complementary cross-section to that of the sleeve-shaped tubular segment so that it is adapted to slide smoothly thereinto. Finally, the clamping means can constitute a bolt which can be utilized for having an instant coupling and locking system, preferably including a pair of trunnions or catch pins fixed on the outside of the sleeve-shaped tubular segment, as well as a resilient clamping member fitted onto the drive-in segment or extension means for clamping to those trunnions.

BRIEF DESCRIPTION OF THE DRAWING

The present invention will be more readily understood with reference to the following detailed description which refers to the accompanying drawings, in which:

FIG. 1 is a side, diagramatical, elevatonal view of the towing attachment of the present invention used for connecting a towing vehicle to a luggage trailer;

FIG. 2 is a side, longitudinal, cross-sectional view of a portion of the towing attachment of the present invention;

FIG. 3 is a side, elevational, cross-sectional view of a portion of the towing attachment of the present invention; and FIG. 4 is a partial, plan, partially sectional view of the towing attachment shown in FIG. 3 taken along lines IV—IV thereof.

DETAILED DESCRIPTION

Referring to FIG. 1, an example is shown of one use for the towing attachment according to this invention in this case between a vehicle 1 of the private motorcar type and a trailer 2 designed to carry luggage. It is to be understood, however, that other applications can be envisaged and, for example, the towing attachment according to this invention can be used to connect commercial type towing vehicles with larger types of transport trailers, having one or more axles.

Referring now to FIGS. 2 and 4, a towing attachment according to this invention is shown which comprises a first part 3 intended to be fitted on the body, frame, chassis or any other structure 4 of the vehicle 1, and a second part 5 to be connected to the tow bar 6 of the trailer 2.

The part 3 includes a support 7 which is designed to be fitted onto the structure 4, preferably by means which are dismountable, but which are not shown in the drawings, primarily since they may be selected in view of the specific characteristics of the particular structure 4, i.e., depending on the type of vehicle to be equipped. In any event, these come within the scope of any one of ordinary skill in the art. The support 7 is, in any case, designated to be fitted to the rear end of a vehicle, and to be appreciably set back from the outermost rear part, so as to be generally concealed with respect to that outermost rear part, or in this case, from bumper 8. The support 7 supports a tubular sleeve 9, preferably of polygonal cross-section, such as rectangular. The sleeve 9 can be fitted onto support 7 in a removable manner, or it may not be removable, but in any case, it is fixed thereto so that the sleeve is, at most, in alignment with the outermost part 8, but preferably, as is shown in the drawing, set back from the latter.

The second part 5 of the towing attachment is composed of a shorter tow bar 10, which is also of a tubular shape, and whose outer cross-section is selected to be, at least for a portion thereof, complementary to the inner cross-section of the sleeve 9. Therefore, as in the present case, the outer dimensions of the tow bar 10 are such that its front segment 11 can slide smoothly inside the sleeve 9. In certain cases, this complementary nature can be limited to the drive-in segment 11, and provisions may be made to give the short tow bar 10 a different cross-sectional shape outside of the segment 11 thereof. The shorter tow bar 10 includes, at its end opposite segment 11, a joint 13 which includes a part 12 by which it is linked to the tow bar 6 of the trailer 2. The tow bar 6 is thus provided with a complementary part 14 which, along with the part 12, forms the joint 13. The joint 13 can be of a type having two degrees of play, and preferably this joint consists of a universal joint, such as a swivel joint 15. According to the embodiment shown in the drawings, swivel joint 15 is carried by the tow bar 6 whereas its complementary housing is contained in part 12 which is integral with the shorter tow bar 10. It is obvious that it is also possible to reverse this arrangement in connection with the assembling, fitting or even ground clearance characteristics of the vehicle and/or of the trailer.

The towing attachment according to this invention further includes a third element which comprises an instant-connection system, which is designated as a whole by reference numeral 16. This element thus permits the connection of parts 3 and 5, and comprises two catch pins 17, shaped as cylindrical trunnions, which are fitted or co-axially formed by the sleeve 9, so as to project from the outer face thereof. In the illustrated embodiment, the catch pins 17 are shaped according to the same axis perpendicular to the longitudinal axis of the sleeve, so as to be situated in a vertical plane traversing the longitudinal axis of the vehicle. The catch pins 17 can be formed or added on in a suitable manner, and are preferably associated by welding, for example, to reinforcement collars 18.

The system 16 further includes, on the shorter tow bar 10 and substantially set back from segment 11 thereof, a resilient clamp 19 comprising, as is clearly shown in FIGS. 3 and 4, two identical branches 20 and 21, mounted in reverse with respect to each other, and hingedly connected to the shorter tow bar 10. In the illustrated example, each branch 20 is hingedly connected to the shorter tow bar 10, by an axis 22 or 23, but it is obvious that the two branches 20 and 21 could, if necessary, be hinged to a common axis. The rotating axes 22-23 are situated on the shorter tow bar 10 so as to be placed in parallel with the plane traversing the longitudinal axis of the vehicle, and of the towing attachments. Each branch 20 or 21 is produced so as to have a U-shaped cross-section, with two parallel wings 24 extending from a common web. These branches are hingedly mounted so as to house segment 11, and so as to face each other by the longitudinal edges of the wings 24. As can be seen in FIG. 4, these mutually facing edges of wings 24 define, in their parts directed towards the segment 11 with respect to the axes 22, 23, semi-circular housing 25 of a radius at least equal, and preferably slightly greater than that of the catch pins 17. Moreover, the forward end portions of these wings 24 directed towards the segment 11 have panes 27 and 28 cut from their mutually facing edges, so that in the position shown in FIG. 4, for each pair of aligned wings corresponding to one of the sides of the segment 11, they define a driving-in passage 29 having convergent edges.

On their sides opposite segment 11 with respect to the axes 22, 23, branches 20 and 21 are provided with extensions 30 and 31, which both extend parallel to the sides of the shorter tow bar 10. These extensions 30 and 31 support resilient members 32 and 33, which rest on the shorter tow bar 10 so as to urge the branches 20 and 21 to pivot relatively in the direction of arrows $f_1$ $f_2$, i.e., in the direction in which the wings 24 are urged to close on the segment 11. Extensions 30 and 31 are provided on their inner faces with parallel edges 34 and 35, which are meant to cooperate with ramps 36 and 37 formed by a cam 38 which is fitted to the end of a rotating handle 39 carried by the shorter tow bar 10. In the example shown, handle 39 comprises a threaded end portion 39a which is screwed into a blind tapping provided in a cross-piece 40 in the shorter tow bar 10. The threaded end portion 39a is preferably associated with a lock washer 41, or to any other similar such means capable of preventing the free loosening of handle 39 from its stable position in which the handle is aligned with the longitudinal axis of the shorter tow bar 10. According to this arrangement, in that position cam 38 is then arranged so that the ramps 36 and 37 cooperate, by the flat top that they form, with the rectilinear edges 34 and 35 of the branches 20 of the clamp 19.

The towing attachment described hereinabove works as follows:

From FIGS. 2, 3 and 4, it is noted that the segment 11 is engaged inside the sleeve 9 to a maximum driving-in position, which is defined by two stop members 42 provided on the segment 11 for cooperating with the edges of the ingoing cross-section of the sleeve 9. In that position, the resilient members 32 and 33 urge the branches 20 and 21 into their closed position, so that the wings 24 clamp the end driving-in part of the sleeve 9, and enclose the two catch pins 17. The branches 20 and 21 are held in that position by the locking and immobilizing action exerted by the cam 38, which is held in the position where the flat top parts of the ramps 36 and 37 cooperate with the rectilinear edges 34 and 35 of the branches 20 and 21 via the handle 39.

In that position, the towing attachment according to this invention links together the vehicle 1 and the trailer 2, but the trailer can nonetheless be subject to lateral movements centered on universal joint 13.

To detach the trailer 2 from the towing vehicle 1, it is therefore only necessary to pivot handle 39 in the direction of arrow $f_3$, thus also pivoting cam 38 and causing the smoothing out of the ramps 36 and 37 with respect to the rectilinear edges 34 and 35 of branches 20 and 21. Release of branches 20 and 21 occurs after rotation of the handle of about 90°. The user can then manually bring branches 20 and 21 closer together, against the action of the resilient member 32 and 33, by pivoting them on the axes 22 and 23 in the opposite direction to arrows $f_1$ and $f_2$. The effect of this is to open wings 24, and as a result to release catch pins 17, so as to allow the sliding of the segment 11 into or out of sleeve 9. It thus becomes possible to release the shorter tow bar 10 and to pull it out of the part 3 of the towing attachment which is permanently fitted on the vehicle. The shorter tow bar 10 can then be pivoted about the axis 13 so as to be brought parallel to tow bar 6, on which it can be held and immoblized in position by any suitable means.

In this state, the vehicle only comprises the part 3 which is completely hidden with respect to the outermost rear end 8, so that the vehicle then has the appearance of a conventional vehicle, i.e., on which is not equipped for towing a trailer.

To thus then attach the trailer 2 to the vehicle 1, and to obtain the unitary constitution of the towing attachment according to this invention by assembling together part 3 and 5 by means of system 16, the user merely brings the shorter tow bar 10 in line with the tow bar 6 in reverse to the joint 13, so as to be able to fit the segment 11 inside the sleeve 9. This only requires a relative axial sliding until pins 17 are brought into the drive-in passages 29 of the wings 24 of the closed branches of the clamp 19. By then continuing this sliding-in action, the pressure exerted by the catch pins 17 against the cut panes 27 and 28 causes the branches 20 and 21 to open against the action of the resilient members 32 and 33. The wings 24 then open out to allow the relative passage of catch pins 17, which are thus led to go in relatively as far as the housings 25, inside which they are grasped by the automatic closing of the wings 24 under the action of springs 32 and 33 acting on branches 20 and 21. In this position, it suffices then for the user to return the locking handle 39 to the position illustrated in FIG. 4, in the opposite direction to arrow $f_3$, in which the flat top parts of the ramps 36 and 37 cooperate directly with edges 34 and 35 of branches 20 and 21 which are thus held, against any sudden relative movement, in their closed position on sleeve 9 and catch pins 17.

This closed position is automatically obtained with safety since the maximum relative engagement of the catch pins 17 inside the passages with convergent edges 29, and as far as the housing 25, is established by the fact that the stop members 42 are brought into contact with the edges of the ingoing cross-section of the sleeve 9.

Besides the above-noted advantage of total concealment of the part of the attachment which is permanently fixed to the towing vehicle, it should also be noted that with this invention it is possible to ensure maximum protection for that part against any knocks that could involve damage thereto, and thus result in a lack of a complementarity with the corresponding part carried by the shorter tow bar 10.

The towing attachment according to this invention is also advantageous since, as can be seen in FIG. 3, it is now possible for the parts comprising the parts 3 and 5, and in particular the sleeve 9 and the segment 11, to act as a connector for any electrical circuit provided on the vehicle and on the trailer. This is, for example, the case with motor trailers which, according to current regulations, must be equipped with signal lights corresponding to those of the vehicle's which can be concealed by the presence of the trailer. According to the invention, it is thus recommended to fit a socket 43 for an electrical connection at the bottom of the sleeve 9, whose plug 44 is situated in the segment 11. The plug and socket 43 and 44 are electrically connected to conductors 45 and 46 leading to the electrical functions which are to operate when the trailer is in tow. Such electrical connection is thus automatically accomplished when the shorter tow bar 10 is placed in the position complementing the parts 3 and 5 by means of the system 16.

Besides the obvious advantages of said automatic connection, it should also be noted that the fact of fitting and a plug and socket inside the sleeve 9, and at the end of the segment 11, ensures that the plug and socket will be protected against risk of damage and/or of substances coming into play which could affect the connection.

Another advantage hereof resides in the fact that the polygonal shape of segment 11 and of sleeve 9, not only makes it possible to predirect the axis of the catch pins without having to rotate the segment 11 on the longitudinal axis, but also automatically ensures adequate cooperation of the electrical plug and socket without any possible risk of any improper or defective connection, and it does so without it being necessary to provide plugs and sockets having connecting members which work only in a preferential direction.

The drawings also show that the shorter tow bar 10 is slightly bent in its median part. However, it is obvious that such an arrangement depends on the relative ground clearance of the towing vehicle and of the trailer, and that any other arrangement may therefore be envisaged to obtain such a result.

This invention finds an application in the coupling of trailers to private cars, and also to certain commercial vehicles.

What is claimed is:

1. A towing attachment for attaching a trailer including a tow bar to the end of a vehicle comprising a tubular member attached to said vehicle, extension means including a first end and second end, said first end of said extension means being rotatably attached to said tow bar of said trailer and said second end of said extension means being adapted for releasable attachment to said tubular member, said second end of said extension means having a cross-sectional shape which is complementary to the cross-sectional shape of said tubular member whereby it can slide smoothly into said tubular member for attachment thereto, and clamping means for releasably clamping said second end of said extension means to said tubular member, said clamping means including fixed trunnion means extending from said tubular member and resilient clamping means affixed to said extension means, whereby said resilient clamping means may be releasably clamped to said trunnion means when said extension means slides into said tubular member, said resilient clamping means being pivotable between first and second positions, so that when said resilient clamping means is in said first position it does not interfere with the sliding of said extension means into said tubular member, and when said resilient clamping means is in said second position, it prevents said extension means from being slidably released from said tubular member, and whereby said tubular member may be located inwardly with respect to said end of said vehicle.

2. The towing attachment of claim 1 including locking means for preventing said clamping means from releasing said second end of said extension means from said tubular member.

3. The towing attachment of claim 1 or 2 wherein said resilient clamping means comprises a pair of pivotable wing members pivoted to said extension means at a location inward from said second end of said extension means whereby said pivotable wing members do not interfere with the sliding of said extension means in said tubular member, and including wing extension means for releasably clamping said trunnion means when said extension means has been slid into said tubular member.

4. The towing attachment of claim 3 wherein said trunnion means extends from opposite sides of said tubular member, and said pair of wing members each has a substantially U-shaped configuration, said wing extension means comprising the corresponding arms of said pair of U-shaped wing members whereby each of said pair of wing members engages said trunnion means extending from the opposite sides of said tubular member.

5. The towing attachment of claim 4 wherein said wing extension means includes notch means on each of said arms of said U-shaped configuration.

6. The towing attachment of claim 3 wherein said resilient clamping means includes biasing means for resiliently biasing said resilient clamping means towards said second position.

7. The towing attachment of claim 2 wherein said locking means comprises a pivoting locking member, said pivotable locking member being pivotable between first and second positions, whereby when said pivotable locking member is in said first position said resilient clamping means is maintained in said second position, and when said pivotable locking member is in said second position said resilient clamping means is pivotable between said first and second positions.

8. The towing attachment of claim 4 wherein said trunnion means extend from the opposite sides of said tubular member in the same axis in the vertical plane traversed by the longitudinal axis thereof.

9. The towing attachment of claim 1 wherein said extension means include stop means for determining the maximum degree of insertion of said extension means into said tubular member.

10. The towing attachment of claim 1 wherein both said tubular member and said extension means have polygonal cross-sections.

11. The towing attachment of claim 1 or 10 wherein said tubular member includes first electrical connection means and said extension means includes second electrical connection means whereby electrical connection between the electrical systems of said vehicles and said trailer may be obtained between said first and second electrical connection means when said extension means has been slid into said tubular member.

* * * * *